Jan. 23, 1968
C. D. FLANAGAN
3,365,617
PROTECTIVE MEANS FOR ELECTRICAL CIRCUITS
Filed March 25, 1964
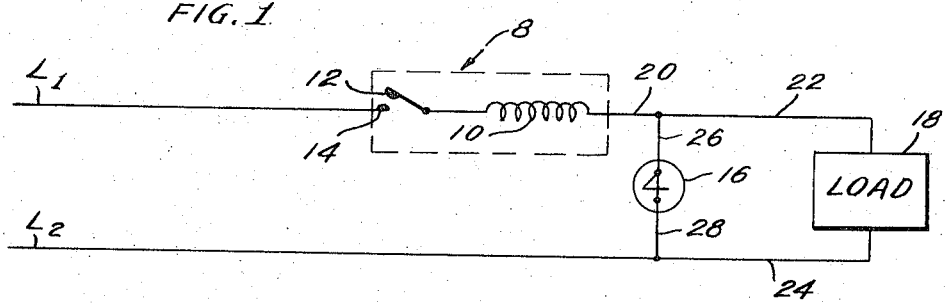
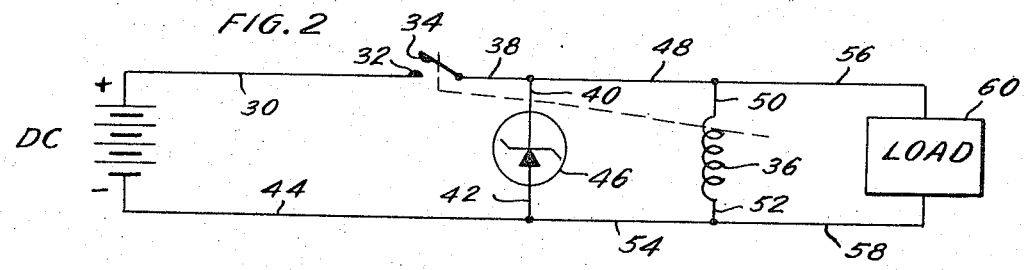
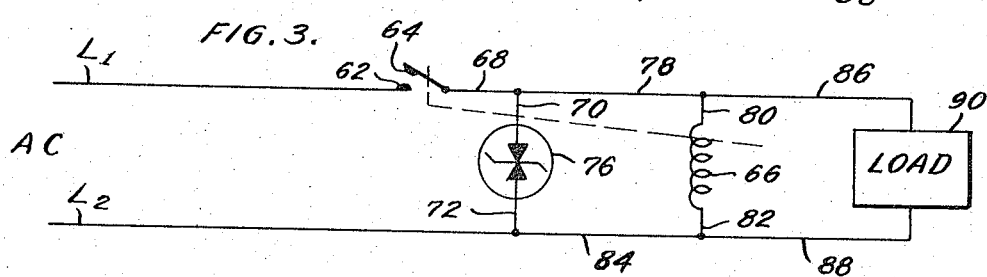
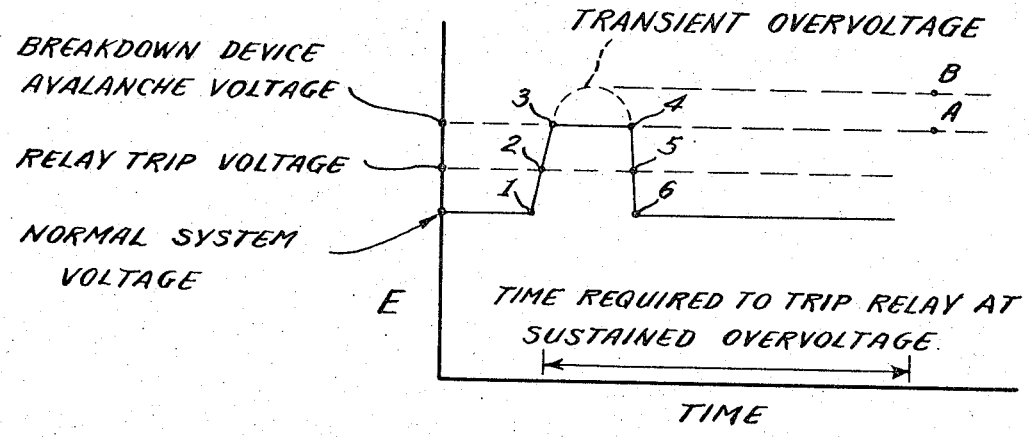
INVENTOR.
CHARLES D. FLANAGAN,
BY
ATT'Y.

United States Patent Office 3,365,617
Patented Jan. 23, 1968

3,365,617
PROTECTIVE MEANS FOR ELECTRICAL
CIRCUITS
Charles D. Flanagan, Attleboro, Mass., assignor to Texas Instruments Incorporated, Dallas, Tex., a corporation of Delaware
Filed Mar. 25, 1964, Ser. No. 354,642
14 Claims. (Cl. 317—31)

ABSTRACT OF THE DISCLOSURE

A system for protection from transient high voltages as well as sustained voltages and current overloads of a lower magnitude for an electrical circuit having sensitive electrical components such as transistors, semiconductors, etc., comprising the combination of an electromagnetic or thermostatic circuit breaker in series with the load and either a breakover or avalanche type device connected across the load. In one embodiment, for a direct current input, a four layer breakover device is employed and for alternating current input, a five layer breakdown device is employed. Another embodiment uses a single Zener diode as an avalanche device, a coil of a relay and the load connected in parallel and placed across a direct current source while for alternating current a double Zener diode is substituted for the single Zener diode.

---

This invention relates to electrical circuit or component protective systems and in particular to protective systems and components primarily adapted to prevent damage to sensitive electrical switch gear of either the electromechanical or transistorized kinds.

Among the several objects of the invention may be noted the provision of a protective system for an electrical circuit which is responsive within extremely short times, in the event of voltage overloads on the circuit, to limit the voltage to values safe for the circuit; the provision of a combined transistorized and electromechanical protective system for an electrical circuit whereby both over-current and over-voltage conditions in the circuit are prevented from harming the circuit; the provision of a combined transistorized and electromechanical protective system for an electrical circuit whereby over-voltage conditions in the circuit are prevented from harming the circuit; the provision of an arrangement of condition responsive devices in an electrical circuit whereby such condition responsive devices are capable not only of limiting transient high voltages to a safe low value within times in the order of nanoseconds but also of protecting the circuit in which said condition responsive devices are connected against harm from sustained over-current or over-voltage conditions of lower value; and the provision of circuits and devices of the above classes which are economical to manufacture and reliable in operation. Other objects and features will be in part apparent and in part pointed out hereinafter.

The invention accordingly comprises the elements and combinations of elements, features of construction and circuitry and arrangements of parts which will be exemplified in the structures and circuits hereinafter described, and the scope of which will be indicated in the following claims.

In the accompanying drawings, in which two of various possible embodiments of the invention are illustrated, FIG. 1 is a schematic diagram of a circuit of one embodiment of this invention;

FIG. 2 is a schematic diagram of a circuit of a second embodiment of this invention;

FIG. 3 is a still further schematic diagram of a circuit of a third embodiment of this invention; and FIG. 4 is a graph illustrating certain operational characteristics of this invention, the graph being schematic and being presented in order to illustrate more clearly the operation of the embodiments of FIGS. 2 and 3.

Similar reference characters indicate corresponding parts throughout the several views of the drawings.

As indicated earlier in this application, the invention is concerned with protecting sensitive electrical components in an electrical circuit from the damaging effects of transient high voltages as well as sustained voltages and currents of lower magnitude but whose values the component cannot endure for long without permanent damage or outright destruction. As examples of such sensitive electrical elements may be mentioned transistors, other semiconductor devices, and sensitive electrical meters of the electromagnetic types. For the purpose of describing this invention, the description will be applied to the protection of semiconductors in general, but it will be realized that it is within the skill of the art to apply the teaching herein to the protection of other sensitive electrical components.

The failure of semiconductor devices can result from many externally applied conditions but the fundamental cause of failure is excessive temperature in some part of the semiconductor structure. This excessive temperature, which most commonly occurs at one of the device junctions, ultimately leads to destruction of the device. Depending on the particular construction, it is also possible that the device will fail as a result of solder melting, lead fusing, or as a result of degradation of characteristics caused by the overtemperature operation. Less frequently, very high current pulses will cause vaporization of the semiconductor material or leads which result in an open circuit failure. Although the basic failure is a result of excessive temperature, the external conditions leading to failure include reverse voltages in excess of rating, high switching rates, overcurrent, and high ambient temperatures.

The maximum junction temperature is specified by the manufacturer of any given device and is usually of the order of 100° C. for germanium components and 175° C. for silicon devices. At temperatures much greater than this either as a result of power dissipation or ambient conditions, there occurs progressively a loss of operating characteristics, higher probability of failure, destruction of the junction, and finally physical failure due to melting of solder connections, fusing of lead wires, etc. Because of these temperature limitations, the power handling capacity at any given ambient must be limited to the values indicated by the derating curves published by the device manufacturer. The rated power handling capacity of the device is determined on the one hand by the maximum junction temperature and determined on the other by the device characteristics and the thermal resistance of the package and of the ultimate heat sink. Excessive currents, therefore, give rise to temperatures beyond the maximum allowable junction temperature and will eventually cause a device failure.

As mentioned earlier, although a device may fail as a result of voltages in excess of rating, the cause of failure is normally thermal. Most devices can withstand voltage breakdown in the reverse direction provided the power dissipation in the device does not exceed the rated level. This implies that there be sufficient impedance in series with a device to limit the current to a level several times lower than the normal forward current. In the typical circuit application the let through current for a given excess voltage is limited only by the load impedance which can result in power dissipation several hundreds times greater than when the device is carrying this same current in the forward direction. Failure under such conditions can occur within a matter of a few microseconds.

Voltage transients can occur as a result of conditions within the semiconductor circuitry or from external sources which are coupled through the power supply to the semiconductor device. Voltages of eight to ten times normal peak voltage are possible as a result of switching inductive circuit elements.

A transient condition which is a result of both current and voltage effects is encountered in devices which are used in switching applications. Switching a semiconductor device from the off to the on state or vice versa results in shifting its operation from one state of low power dissipation (high voltage and leakage current) to a second state of low power dissipation (low voltage drop and relatively high current flow). Since this switching must take place in a finite period of time in any real circuit or device, there exists an instant during the switching where the current has risen to an appreciable level and the voltage has not as yet dropped to the on level and as a result, the power dissipated is very large.

The present invention provides a solution for these problems by combining the operational characteristics of an electromagnetic or thermostatic circuit breaker with the operational characteristics of either breakover or of avalanche type devices. By avalanche type of devices is meant for example, a breakdown diode or selenium rectifier. By breakover devices is meant, for example, four or five layer diodes or neon bulbs.

Referring now to FIG. 1, there is shown schematically a circuit in which letters $L_1$ and $L_2$ refer to power input lines. The dotted rectangle 8 represents schematically and generally an electromagnetic relay or circuit breaker having therein the relay coil 10 and the normally closed contacts 12 and 14. (The contacts are shown in their open position in this and all figures to indicate that the protective circuit and device has functioned to remove power from the load to be protected.) A four layer semiconductor device 16 (or a five layer semiconductor as pointed out below) is shown schematically and is connected across the line $L_1$–$L_2$ in parallel with the load 18. (For a D.C. input, a four layer breakover device can be used; whereas for an A.C. input, a five layer breakover device is preferred.)

Load 18 may be a transistorized circuit or a circuit having other types of semiconductors. As indicated above such a circuit and the individual semiconductor components in it must be protected against high transient voltages and sustained over-voltage and over-current conditions of lower value.

As connected, power flows to the load through line $L_1$ normally closed contacts 12 and 14, relay or circuit breaker coil 10, line 20, line 22, load 18, line 24, and back to the power source via line $L_2$. A breakover device, such as a four or five layer device, or Shockley diode, is connected by lines 26 and 28 across the load 18. Such a device has the typical characteristic that after it has broken over, the voltage across it drops to a lower value and the current through it increases sharply to a much larger value. Under normal operating conditions, the voltage appearing across the load 18 is the full input voltage. Assuming, now, that a high transient voltage appears at the input side $L_1$–$L_2$ and is of such magnitude that unless prevented within nanoseconds from staying on the load 18, the latter will be damaged. The breakover device 16 will, however, breakover within the order of a hundred nanoseconds of the time the high transient voltage appears and will abruptly conduct currents of much higher value. The resistance of the device 16 drops and consequently, the voltage drop across it is low. Thus the voltage drop across the load 18 is low and becomes so within manoseconds of the time the high transient voltage appeared at the input.

The higher current through the device 16 now energizes the relay or circuit breaker coil 10 and causes the contacts 12 and 14 to open, thus clearing the circuit. Upon opening of contacts 12 and 14, the voltage impressed across the device 16 goes to zero, and the device 16 is restored to its original essentially non-conducting condition.

In the event of sustained overloads of lower magnitude, such that the four or five layer device 16 does not breakover, the relay circuit breaker coil will operate due to the overload current through it to open contacts 12 and 14 and thus protect the circuit.

If desired, the relay or circuit breaker 8 may be one using a thermostatic unlatching device instead of the coil 10. That is, it can be a thermal time-delay relay or a so-called thermostatic circuit breaker. In both cases, that is, the device 8 is either an electromagnetic or a thermostatic device, the characteristics of the device are tailored to combine with the characteristics of the device 16 to protect load 18 from damage due to all values of overload voltage and overload current.

Thus it can be seen that in the above circuit, when the load is subjected to predetermined overload currents, the current responsive member 8 will interrupt the circuit to the load 18. When the load 18 is subjected to overvoltages above the breakover voltage rating of the condition responsive device 16, the device 16 will become current conducting and will cause an abrupt increase in current in the current responsive device 8, to cause the latter to trip and open the circuit to the load 18. When device 16 breaks-over (or "fires") it shunts both the current and voltage from the load 18, thus protecting the latter during the reaction time of the relay 8.

The reaction time of the condition sensitive device 16 is in the order of one hundred nanoseconds. Thus it can be seen that by this circuit and combination of elements is provided virtually instantaneous sensing of over-voltage and suppression (by the shunting action) of those voltages with respect to the load. Combined voltage and current protection is provided, and the system does not depend for operation on the duration and magnitude of the overvoltage provided the latter exceeds the breakover voltage of the device 16 and that overvoltage period exceeds the minimum breakover time for device 16.

The above embodiment is shown, for clarity, in schematic form. It is contemplated that it is within the scope of this invention to house the contacts 12–14, the coil 10, and the breakover device 16 all in one package or casing, together with the other parts customarily used in circuit breakers.

Turning now to FIGS. 2 and 3, there are shown schematic circuits using a breakdown device such as a Zener diode. FIG. 2 is for direct current usage, and FIG. 3 is for alternating current.

As is well-known, a Zener diode is an avalanche device. Such a device can be defined as a device which is essentially non-conducting until a predetermined voltage is impressed across it. It then abruptly becomes conducting and will remain conducting until the voltage impressed across it decreases to the initial conducting value. At that point, the devices abruptly cease to conduct. It is also well-known that a plot of the E–I characteristic curve for such devices will show that the voltage remains constant at essentially the breakdown voltage once the breakdown voltage is reached.

Referring now to FIG. 2, the direct current source is shown by the battery D.C., and this is connected by line 30 to the stationary contact 32 of a relay having a movable contact 34 and coil 36. Lines 38, 40, 42 and 44 connect the Zener diode 46 in series with contacts 32–34 and across the battery D.C. Lines 48, 50, 52 and 54 connect the coil 36 of the relay across the Zener 46 and thus also in series with the contacts 32–34 across battery D.C. Lines 56 and 58 connect the load 60 across the coil 36 and across the Zener 46. Thus, in this circuit, the Zener diode 46, coil 36 and load 60 are all connected in parallel, and this parallel circuit is placed across the D.C. battery through (or in series with) the contacts 32–34.

The circuit and combination of elements of FIG. 3 is adapted for A.C. by using the same connections but substituting the double Zener diode 76 for the single diode 46. The alternating current source is indicated by the letters $L_1$ and $L_2$. Line $L_1$ connects to stationary contact 62 of the relay and movable contact 64 is connected by lines 68 and 70 to the Zener diode 76. The other side of diode 76 is connected by line 72 to the other side of the A.C. power source via line $L_2$. Coil 66 of the relay is connected across the Zener 76 by lines 78, 80, 82 and 84. Load 80 is connected across coil 66 by lines 86 and 88. Thus, as shown in FIG. 2, the Zener diode 76, relay coil 66 and load 90 are connected in parallel and this parallel group is connected to the A.C. power source through the contacts 62–64.

Operation of the circuits of both FIGS. 2 and 3 is similar and will be described together. The circuit and component assemblies of FIGS. 2 and 3 are essentially voltage sensing, the relay coil in these instance being of the voltage sensing type. Coils 36 and 66 must be selected so as to trip (that is, open) the contacts 32–34 and 62–64, respectively, at an overvoltage which of course exceeds the normal safe voltage for loads 60 and 90, but which is less than the avalanche voltage of the Zener diodes 46 and 76, respectively. The circuit breaker comprising the contacts 32–34 and coil 36 (or the contacts 62–64 and coil 66) will trip to open the circuit when the overvoltage is sustained long enough (for example, on the order of magnitude of 10 milliseconds) for a conventional magnetic relay. The opening time of the relay must be selected to fit the particular protective function required where the normal overload voltages occur.

When, however, high transient voltages appear which would damage the loads 60 and 90 before the respective relays could open when acting in their usual manner, then the Zener diodes (or other avalanche devices) operate as follows:

Referring to FIG. 4, there is shown a plot of voltage versus time, the voltage being that impressed on the circuit. Point 1 indicates the level of voltage when the circuit is being operated normally and properly. At 1 the voltage starts to rise due to a transient phenomenon and eventually reaches that portion identified as the transient overvoltage. However, at point 3, the Zener diode breaks down, and becomes conducting in a time of the order of magnitude of 100 nanoseconds. This limits the system to the voltage of the Zener diode itself, that is, the voltage of point 3. It will be noticed that this voltage is higher than the relay tripping voltage but that in the interval of time that the transient lasts, that is, from point 1 to point 6, the relay has not had time to react to open its contacts. However, the plot illustrates a situation in which the load can withstand an amount of overvoltage indicated by point 3 for the time duration of point 3 to point 4.

Thus the advantages of this system is that it avoids nuisance trip-outs on temporary transients and does not allow the voltage on the load to exceed a value of overvoltage which is safe for the load within the time it takes the electromagnetic (or thermostatic type) relay to open the circuit. The system is thus kept operational until such time as the over-voltage is sustained long enough to cause the relay to perform its circuit opening function. Another advantage is that the relay itself acts to protect the avalanche device (46 or 76) from sustained power dissipation which might result from sustained overvoltages, such power dissipation being high enough to cause burn-out of the avalanche device itself.

As in the FIG. 1 embodiment, it is contemplated to be within the scope of this invention to combine in one package or casing the contacts 32–34, coil 36 and avalanche device 46 and the other mechanical parts customarily used in circuit breakers.

As many changes could be made in the above constructions without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

I claim:

1. Protective means for protecting an electrical load from excessive voltages comprising an avalanche type voltage sensitive device adapted to be connected in parallel with said load, a stationary electrical contact, a movable electrical contact adapted to co-operate with said stationary contact to make and break an electrical circuit, one of said stationary and movable contacts being connected to one side of said parallel connected voltage sensitive device and the other of said contacts being adapted to be connected to one side of a source of electrical energy, electrically responsive means for moving said movable contact with respect to said stationary contact to break an electrical circuit, the voltage across said electrical means being controlled by said voltage sensitive means, and the other side of said parallel connected voltage sensitive means being adapted to be connected to the other side of said source of electrical energy, the electrically responsive means adapted to move said movable contact at an overload voltage less than the avalanche voltage of said voltage sensitive device whereby said voltage sensitive device protects said load from high transient voltages and said electrically responsive means protects said voltage sensitive device and said load from sustained over-voltage conditions.

2. The protective means of claim 1 in which said electrically responsive means comprises the coil of an electromagnetic switch.

3. The protective means of claim 1 in which said electrically responsive means comprises the thermostatic element of a thermostatic switch.

4. The protective means of claim 1 in which said voltage sensitive device is an avalanche-type semiconductor device.

5. The protective means of claim 1 in which said voltage sensitive device is a break-over device as to which the slope of the curve formed by plotting the voltage applied to the device as ordinates and the current passing through the device as abscissae becomes negative after a predetermined break-over voltage is applied to the device.

6. Protective means for protecting an electrical load from excessive voltages comprising an avalanche type voltage sensitive device having two terminals, a stationary electrical contact, a movable electrical contact adapted to co-operate with said stationary contact to make and break an electrical circuit, and means responsive to electrical current therethrough for actuating said movable contact, one of said stationary and movable contacts being connectible to one side of an electrical power source, the other of said contacts being connected to one of said terminals and to one side of said means and being connectible to one side of said load, the other of said terminals being connected to the other side of said means and being connectible to the other side of said load and the other side of said power source, the current responsive means adapted to move said movable contact at an overload voltage less than the avalanche voltage of said voltage sensitive device whereby said voltage sensitive device protects said load from high transient voltages and said current responsive means protects said voltage sensitive device and said load from sustained over-voltage conditions.

7. The protective means of claim 6 in which said means responsive to electrical current therethrough comprises the coil of an electromagnetic switch.

8. The protective means of claim 6 in which said means responsive to electrical current therethrough comprises the thermostatic element of a thermostatic switch.

9. The protective means of claim 6 in which said voltage sensitive device is an avalanche-type semiconductor device.

10. Protective means for protecting an electrical load from excessive voltages comprising a voltage sensitive break-over device having two terminals, a stationary electrical contact, a movable electrical contact adapted to co-operate with said stationary contact to make and break an electrical circuit, and means responsive to electrical current therethrough for actuating said movable contact, one of said stationary and movable contacts being connectible to one side of an electrical power source, the other of said contacts being connected to one side of said means, the other side of said means being connected to one of said terminals and being connectible to one side of said load, the other of said terminals being connectible to the other side of said load and the other side of said electrical power source, the break-over device has a curve formed by plotting the voltage applied to the device as ordinates against the current passing through the device as abscissae, the slope of which becomes negative after a predetermined break-over voltage is applied to the device, whereby said break-over device protects said load from a transient high voltage and said electrical current responsive means protects said break-over device and said load from a sustained over-voltage and over-current conditions.

11. The protective means of claim 10 in which said means responsive to electrical current therethrough comprises the coil of an electromagnetic switch.

12. The protective means of claim 10 in which said means responsive to electrical current therethrough comprises the thermostatic element of a thermostatic switch.

13. A circuit comprising an electrical power source; a pair of electrical contacts movable relative to each other for making and breaking an electrical circuit; electrically responsive means for moving said contacts apart to break an electrical circuit; an avalanche-type semiconductor device; and a load; one of said contacts being connected to one side of the power source; the other of said contacts being connected to one side of said semiconductor device, to one side of said electrically responsive means, and to one side of said load; the other side of said load being connected to the other side of said electrically responsive means, the other side of said semiconductor device and to the other side of said power source; said avalanche-type semiconductor breaking down at a voltage below voltages injurious to said load but above the voltage at which the said electrically responsive means will actuate said contacts, the break-down voltage of said semiconductor being at a value non-injurious to said load during the time said voltage is applied.

14. A circuit comprising an electrical power source; a pair of electrical contacts movable relative to each other for making and breaking an electrical circuit; electrically responsive means for moving said contacts apart to break an electrical circuit; a break-over voltage sensitive device having a negative resistance slope; and a load; one of said contacts being connected to one side of said power source; the other of said contacts being connected to one side of said electrically responsive means; the other side of said means being connected to one side of said device and to one side of said load; the other side of said load being connected to the other side of said device and to the other side of said power source; said device, upon breaking over, conducting sufficient current therethrough to cause said electrically responsive means to actuate said contacts, and the voltage across said device during break-over being at a safe value for said load.

References Cited

UNITED STATES PATENTS

| 2,991,396 | 7/1961 | Schurr | 317—11 |
| 3,129,374 | 4/1964 | Relation et al. | 307—88.5 |

OTHER REFERENCES

Application Note, General Electric, May 1961, p. 17.
Silicon Zener Diode and Rectifier Handbook, second edition, Motorola Inc., p. 90.

MILTON O. HIRSHFIELD, *Primary Examiner.*

J. D. TRAMMELL, *Assistant Examiner.*